(12) United States Patent  
Sasaki

(10) Patent No.: US 11,384,824 B2  
(45) Date of Patent: Jul. 12, 2022

(54) LOCK-UP DEVICE

(71) Applicant: EXEDY Corporation, Neyagawa (JP)

(72) Inventor: Mitsuhiro Sasaki, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 17/306,688

(22) Filed: May 3, 2021

(65) Prior Publication Data

US 2021/0372511 A1    Dec. 2, 2021

(30) Foreign Application Priority Data

Jun. 1, 2020 (JP) .............................. JP2020-095659

(51) Int. Cl.  
*F16H 45/02* (2006.01)

(52) U.S. Cl.  
CPC ....... *F16H 45/02* (2013.01); *F16H 2045/021* (2013.01); *F16H 2045/0284* (2013.01)

(58) Field of Classification Search  
CPC ..... F16H 45/02; F16H 2045/0205–021; F16H 2045/0273–0294; B23K 26/22; B23K 26/242; B23K 26/244; B23K 26/1265; B23K 33/006  
See application file for complete search history.

(56) References Cited

U.S. PATENT DOCUMENTS

| | | | |
|---|---|---|---|
| 6,938,744 B2 * | 9/2005 | Tomiyama | F16H 45/02 192/212 |
| 8,225,917 B2 * | 7/2012 | Yamashita | F16H 41/28 192/3.29 |
| 10,077,826 B2 * | 9/2018 | Momiyama | B23K 26/60 |
| 10,337,595 B2 * | 7/2019 | Hilty | F16D 25/0635 |
| 10,428,925 B2 * | 10/2019 | Cai | F16D 25/0638 |
| 11,143,280 B2 * | 10/2021 | Cai | F16H 41/30 |
| 11,156,278 B2 * | 10/2021 | Jewell | F16H 45/02 |
| 11,162,566 B2 * | 11/2021 | Souers | F16H 45/02 |
| 2020/0386275 A1 * | 12/2020 | Murata | F16F 15/13415 |

FOREIGN PATENT DOCUMENTS

| | | |
|---|---|---|
| JP | 2013-217452 A | 10/2013 |
| JP | 2017-166669 A | 9/2017 |

* cited by examiner

*Primary Examiner* — Ernesto A Suarez  
*Assistant Examiner* — James J Taylor, II  
(74) *Attorney, Agent, or Firm* — United IP Counselors, LLC

(57) ABSTRACT

A lock-up device includes a clutch part, a piston, a sleeve, and an oil chamber plate. The clutch part is disposed between a front cover and a turbine. The piston is axially movable, and brings the clutch part into a torque-transmission state. The sleeve is fixed to the inner peripheral part of the front cover. The sleeve has a piston support part and a first butt part. The piston support part supports an inner peripheral surface of the piston to be axially movable. The first butt part is formed on the outer peripheral surface of the piston support part. The oil chamber plate is provided between the piston and the turbine. The oil chamber plate has a second butt part. The second butt part is butt-welded with the first butt part. The oil chamber plate forms an oil chamber. Hydraulic fluid is supplied between the oil chamber and the piston.

4 Claims, 4 Drawing Sheets

LOCK-UP DEVICE

CROSS-REFERENCE TO RELATED APPLICATIONS

This application claims priority to Japanese Patent Application No. 2020-095659, filed Jun. 1, 2020. The entire contents of that application are incorporated by reference herein in their entirety.

TECHNICAL FIELD

The present invention relates to a lock-up device, particularly to a lock-up device for a torque converter transmitting a torque from a front cover to a transmission side member through a turbine.

BACKGROUND ART

A Torque converter is often provided with a lock-up device for transmitting torque directly from the front cover to a turbine. This lock-up device has a piston that can be frictionally connected to the front cover, an input side plate that is fixed to the piston, multiple torsion springs that are supported by the input side plate, and an output side plate that is elastically connected with the piston and the input side plate in the direction of rotation. The output side plate is fixed to the turbine.

In the lock-up device shown in Japan Laid-open Patent Application Publication No. 2017-166669 and Japan Laid-open Patent Application Publication No. 2013-217452, an oil chamber for operating the piston is configured between the piston and the turbine. The oil chamber is composed of a piston and an oil chamber plate. The oil chamber plate is fixed to the sleeve of the lock-up device. The oil chamber plate receives high oil pressure not only from the oil chamber but also from the turbine side. Therefore, high strength is required for the part where the oil chamber plate is fixed to the sleeve.

In the lock-up device illustrated in Japan Laid-open Patent Application Publication No. 2017-166669 and Japan Laid-open Patent Application Publication No. 2013-217452, the oil chamber plate is fixed to the sleeve by welding.

BRIEF SUMMARY

When an oil chamber plate is fixed to a sleeve by welding, lap welding is often used. In the case of this lap welding, the amount of heat required to secure the penetration is large. Therefore, the member is distorted. In particular, in a sleeve, a part that movably supports a piston is provided near a part where an oil chamber plate is fixed. High precision is required for the part that supports this piston. However, when lap welding is performed, distortion may occur in this part as well, and high accuracy may not be obtained.

Further, when an oil chamber plate is fixed to a sleeve by welding, it is necessary to suppress generation of welding beads.

It is an object of the present invention that welding can be performed with a low amount of heat and generation of welding beads is suppressed in a lock-up device, in which an oil chamber is formed by an oil chamber plate, when the oil chamber plate is fixed by welding.

(1) A lock-up device according to the present invention is a lock-up device for a torque converter transmitting a torque from a front cover to a transmission-side member through a turbine of the torque converter. The lock-up device comprises a clutch part, a piston, a sleeve, and an oil chamber plate. The clutch part is disposed between the front cover and the turbine. The piston is movably provided in an axial direction, and the piston brings clutch part into a torque transmission state. The sleeve is fixed to the inner peripheral part of the front cover. The sleeve has a piston support part and a first butt part. The piston support part supports an inner peripheral surface of the piston to be movable in an axial direction. The first butt part is annular and is formed on the outer peripheral surface. The oil chamber plate is provided between the piston and the turbine. The annular oil chamber plate has a second butt part on an inner peripheral surface. The second butt part is butt-welded in contact with the first butt part. The annular oil chamber plate forms an oil chamber, the oil chamber a hydraulic fluid being supplied between the oil chamber and the piston.

In this lock-up device, a sleeve and an oil chamber plate have a butt part. That is, the oil chamber plate is fixed to the sleeve by butt welding. Therefore, as compared with lap welding, it is possible to realize the penetration of the member with a lower amount of heat, and it is possible to reduce the distortion of the member. In addition, generation of welding beads can be suppressed.

(2) Preferably, the sleeve has a first engaging part. The first engaging part is provided on the front cover side of the first butt part on the outer peripheral surface of the sleeve. The first engaging part is an annular member having a diameter smaller than that of the first butt part. The oil chamber plate has a second engaging part. The second engaging part is provided on the oil chamber side of the second butt part on the inner peripheral surfaces of the oil chamber plate. The second engaging part has a diameter smaller than that of the second butt part and engages with the first engaging part.

In this case, the sleeve and the oil chamber plate each have an engaging part. In this case, the oil chamber plate can be supported by the sleeve by the engaging part even when the oil chamber plate receives the oil pressure from the Torque converter side. Therefore, the strength of the welded part can be further strengthened.

(3) Preferably, the front cover has a circular opening in the center. The sleeve further has a welded part inserted into the opening of the front cover and laser welded.

(4) Preferably, the sleeve has an oil passage to provide hydraulic fluid to the oil chamber. An opening of the oil passage is formed between the piston support part and the first butt part in an axial direction.

In this case, an oil passage opening is provided between the piston support part and the first butt part in an axial direction. That is, the piston support part that requires high precision on the outer peripheral surface and the first butt part that is welded (that is, exposed to high heat) are axially separated from each other. Therefore, it is possible to prevent the outer peripheral surface of the piston support part (that is, the piston support surface) from being affected by heat and the accuracy from being lowered.

In the present invention as described above, in the lock-up device in which the oil chamber is formed by the oil chamber plate, when the oil chamber plate is fixed by welding, welding can be performed with a low amount of heat and the generation of welding beads can be suppressed.

DETAILED DESCRIPTION

Figure 1:
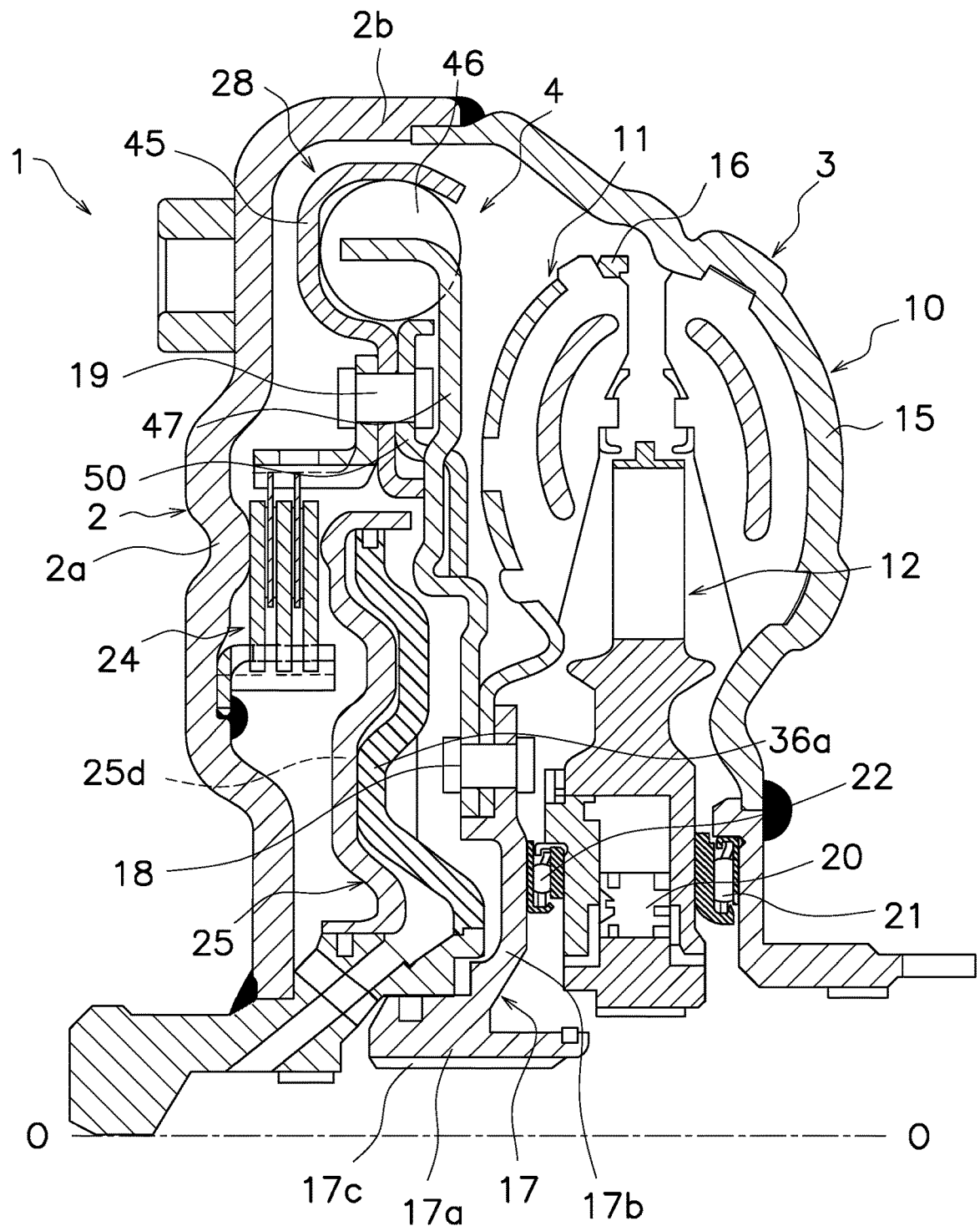
FIG. 1 is a cross-partial view of a torque converter provided with a lock-up device according to an embodiment of the present invention.

FIG. 1 is a partial cross-partial view of a torque converter 1 having a lock-up device 4 according to an embodiment of the present invention. An engine (not illustrated) is provided on the left side of FIG. 1, and a transmission (not illustrated) is provided on the right side of the figure. The O-O illustrated in FIG. 1 is a rotation axis of the torque converter 1 and the lock-up device 4. Further, in the following, the direction away from the rotation axis is referred to as a "radial direction", and the direction along the rotation axis is referred to as an "axial direction".

[Entire Configuration of Torque Converter 1]

The torque converter 1 is a device for transmitting torque from a crankshaft (not illustrated) on the engine side to an input shaft of a transmission. As illustrated in FIG. 1, a torque converter 1 includes a front cover 2, a torque converter main body 3, and the lock-up device 4.

The front cover 2 is fixed to the member on the input side. The front cover 2 is a substantially disc-shaped member, and has a disc part 2a and an outer peripheral tubular part 2b formed on the outer peripheral part of the disc part 2a so as to project toward the transmission side.

[Torque Converter Main Body 3]

The torque converter main body 3 has an impeller 10, a turbine 11, and a stator 12. The impeller 10 has an impeller shell 15 fixed to the outer peripheral tubular part 2b of the front cover 2 by welding. The turbine 11 is provided in a fluid chamber so as to face the impeller 10. The turbine 11 has a turbine shell 16 that constitutes an outer shell. A turbine hub 17 is provided on the inner peripheral part of the turbine shell 16. The turbine hub 17 has a hub 17a provided at the center and a flange 17b extending radially outward from the outer circumference of the hub 17a. The flange 17b is fixed to the inner peripheral part of the turbine shell 16 by a rivet 18. Further, a spline hole 17c with which an input shaft (not illustrated) of the transmission is engaged is formed in the inner peripheral part of the hub 17a. The stator 12 is provided between the inner peripheral parts of the impeller 10 and the turbine 11 and rectifies the hydraulic fluid returning from the turbine 11 to the impeller 10. The stator 12 is supported by a fixed shaft via a one-way clutch 20. A first thrust bearing 21 and a second thrust bearing 22 are provided between the stator 12 and the impeller 10; and the stator 12 and the turbine hub 17, respectively.

[Lock-Up Device 4]

Figure 2:
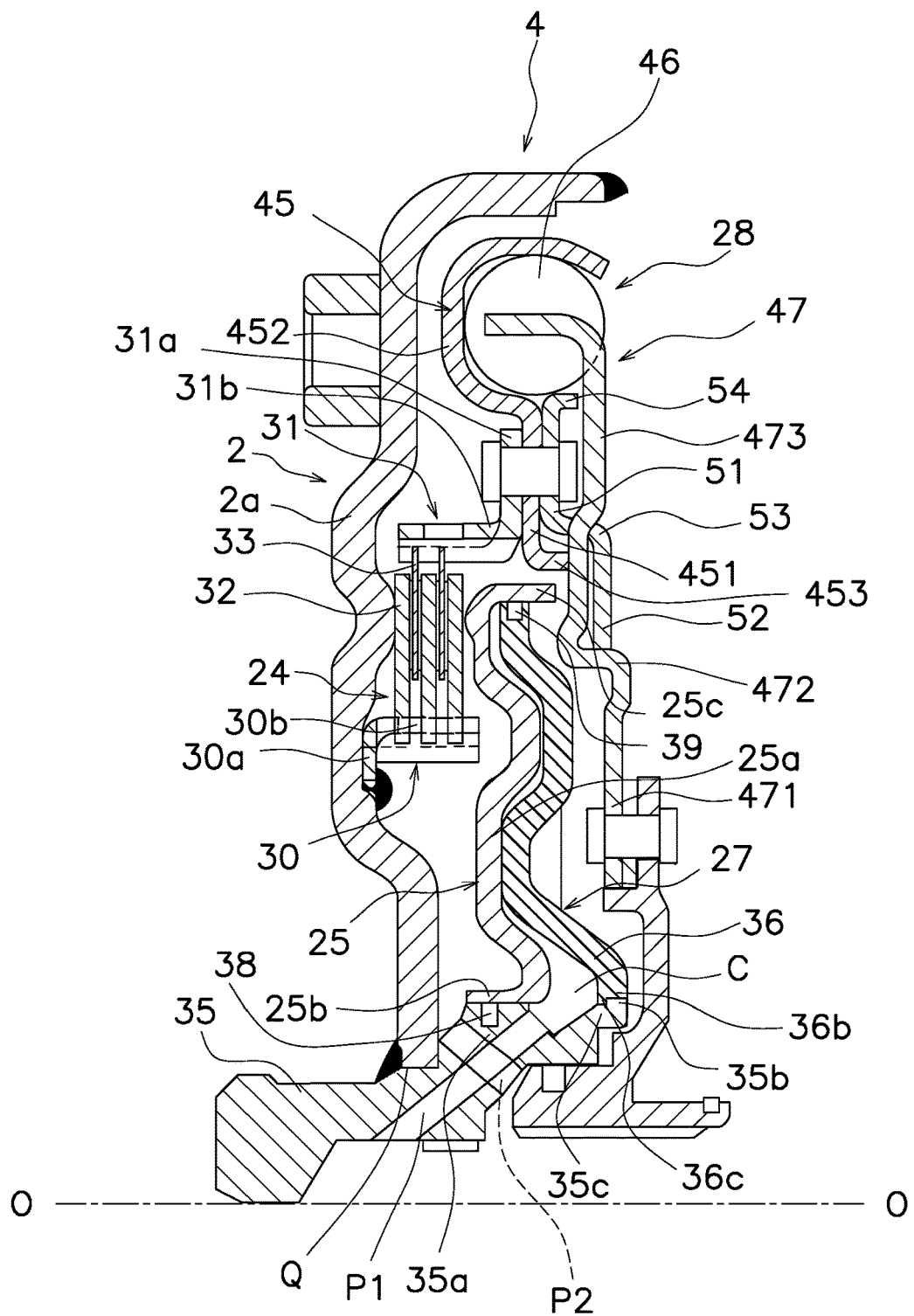
FIG. 2 is a figure which extracts and shows the lock-up device of FIG. 1.
Figure 3:
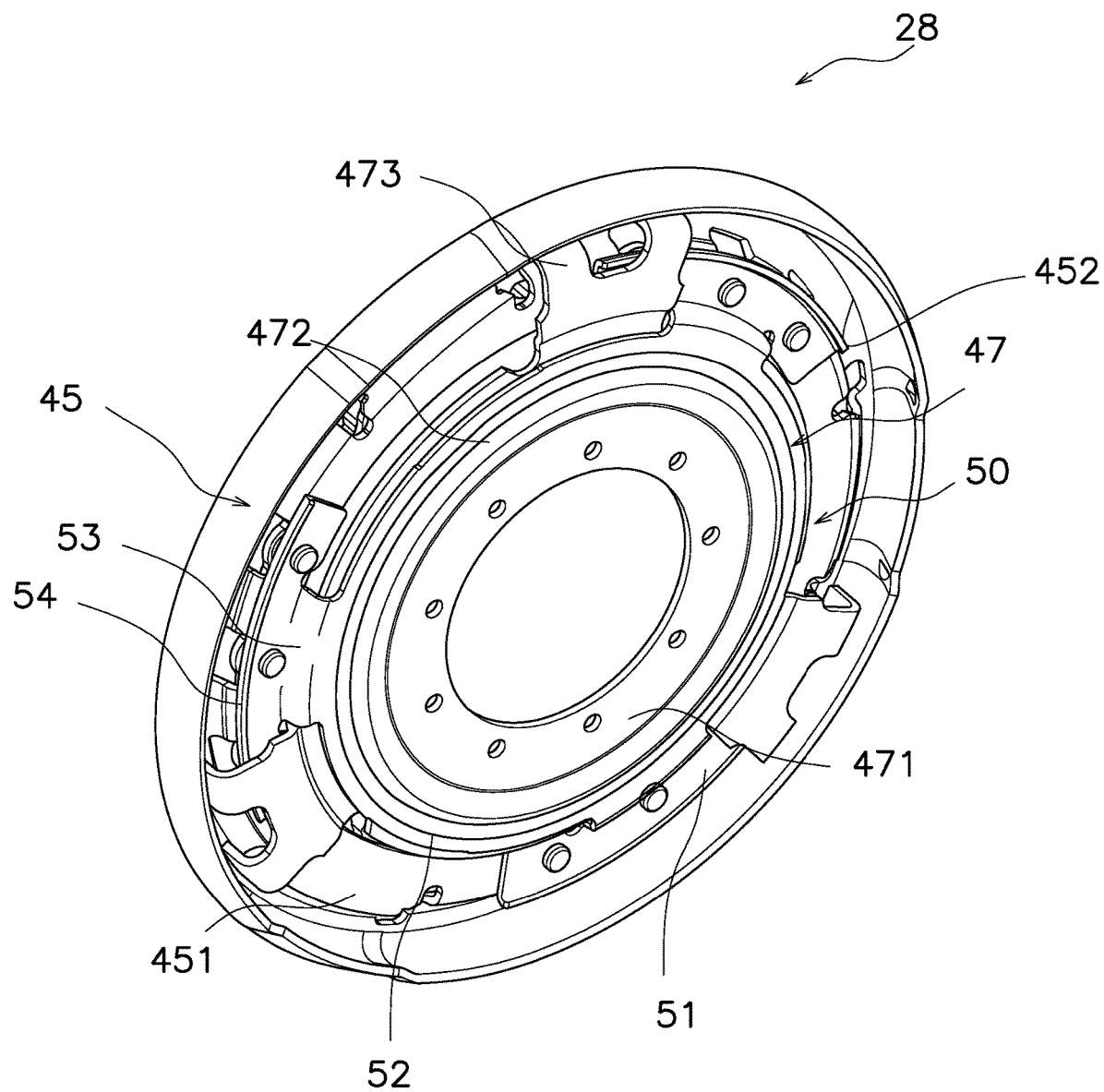
FIG. 3 is a perspective view of a damper part according to an embodiment of the present invention.
Figure 4:
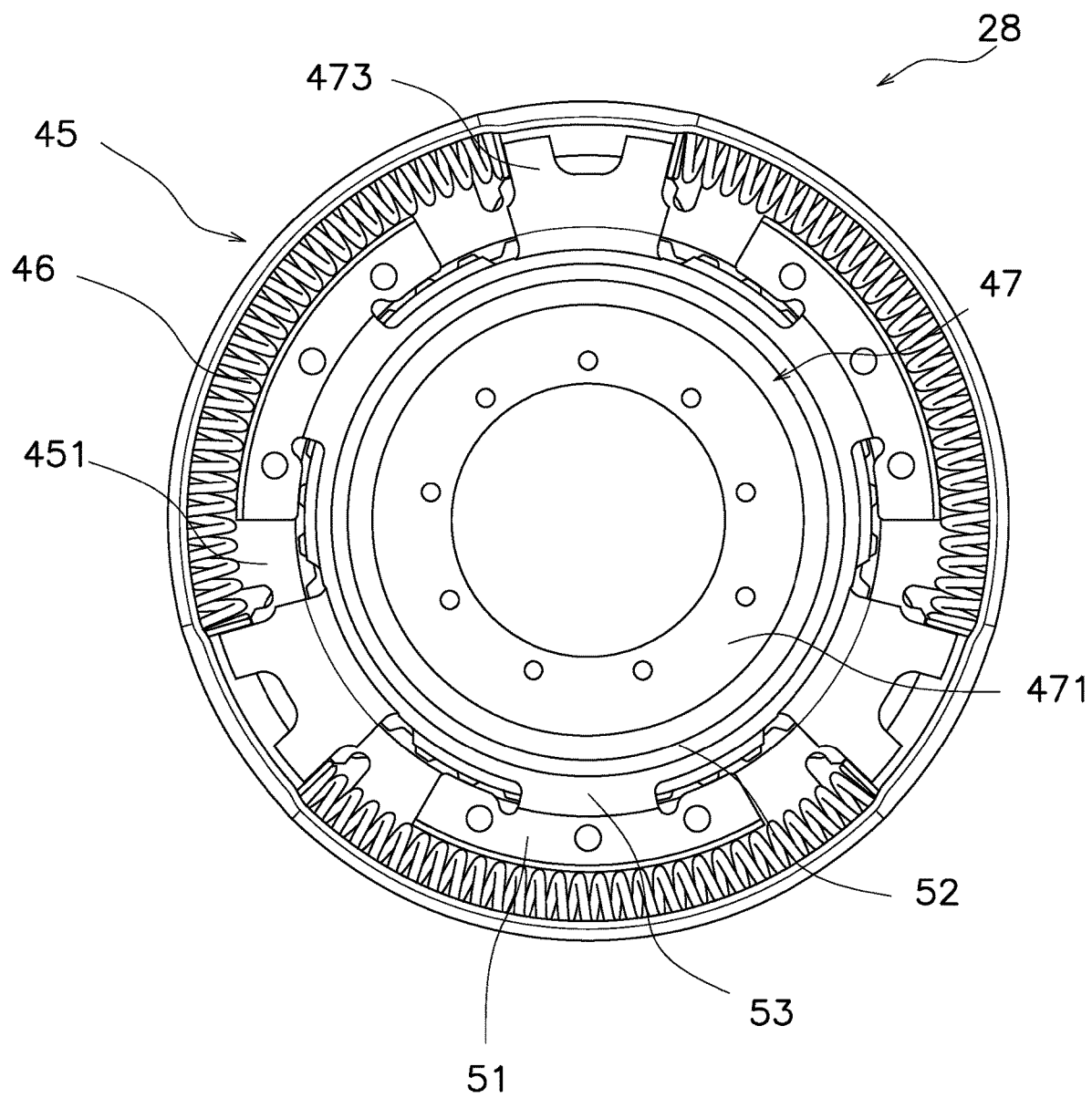
FIG. 4 is a front view of a damper part according to an embodiment of the present invention.

As illustrated in FIGS. 1 and 2, the lock-up device 4 is provided in the space between the front cover 2 and the torque converter main body 3. The lock-up device 4 transmits torque from the front cover 2 to the member on the transmission side via the turbine 11 of the torque converter 1. The lock-up device 4 includes a clutch part 24, a clutch operating part 27 including a piston 25, and a damper part 28.

<Clutch Part 24>

As illustrated in FIGS. 1 and 2, the clutch part 24 is provided between the front cover 2 and the turbine 11. Clutch part 24 transmits or block torque.

Clutch part 24 is a multi-plate type clutch. Clutch part 24 has an inner peripheral drum 30, an outer peripheral drum 31, and a plurality of first clutch plates 32 and second clutch plates 33, respectively.

The inner peripheral drum 30 has a fixed part 30a and an inner peripheral tubular part 30b. The fixing part 30a is formed of a disk in an annular shape, and is fixed to the side surface of the front cover 2 by welding. The inner peripheral tubular part 30b is formed by bending the outer peripheral part of the fixed part 30a toward the turbine 11. A plurality of grooves are formed in the inner peripheral tubular part 30b at predetermined intervals in the circumferential direction.

The outer peripheral drum 31 has a connecting part 31a and an outer peripheral tubular part 31b. The connecting part 31a is formed of a disk in an annular shape. The outer peripheral tubular part 31b is formed by bending the inner peripheral part of the connecting part 31a toward the front cover 2. The outer peripheral tubular part 31b is provided so as to face the inner peripheral tubular part 30b of the inner peripheral drum 30 in the radial direction. A plurality of grooves are formed in the outer peripheral tubular part 31b at predetermined intervals in the circumferential direction.

The plurality of first clutch plates 32 and the second clutch plates 33 are formed in a disk shape and are provided alternately in the axial direction. A plurality of teeth are formed on the inner peripheral part of the first clutch plate 32, and are slidably engaged with the groove of the inner peripheral tubular part 30b of the inner peripheral drum 30. Therefore, the first clutch plate 32 cannot rotate relative to the inner peripheral drum 30, and is movable in the axial direction. Further, the second clutch plate 33 has a friction material fixed on both sides. A plurality of teeth are formed on the outer peripheral part of the second clutch plate 33, and are slidably engaged with the groove of the outer peripheral tubular part 31b of the outer peripheral drum 31. Therefore, the second clutch plate 33 cannot rotate relative to the outer peripheral drum 31, and is movable in the axial direction.

<Clutch Operating Part 27>

The clutch operating part 27 is a mechanism for turning the clutch part 24 on (lock-up on state, that is, power transmission state) or off (lock-up off state, that is, power transmission release state), and includes a piston 25, a sleeve 35, and an oil chamber plate 36.

—Piston 25—

The piston 25 is formed in an annular shape and is provided on the transmission side of the front cover 2. The piston 25 is supported by the sleeve 35 so as to be movable in the axial direction. The piston 25 puts the clutch part into a torque transmission state.

The piston 25 has a disk part 25a, an inner peripheral tubular part 25b, and an outer peripheral tubular part 25c. The outer peripheral part of the disk part 25a bulges toward the front cover 2 side, and can press the first clutch plate 32 of the clutch part The inner peripheral tubular part 25b is formed so as to project from the inner peripheral end part of the disc part 25a toward the front cover 2. The outer peripheral tubular part 25c is formed so as to project from the outer peripheral end part of the disk part 25a toward the turbine 11.

—Sleeve 35—

The sleeve 35 is a member extending in the axial direction and has a space in the center. The engine side of the sleeve 35 is inserted into the inner peripheral opening Q of the front cover 2 and fixed to the front cover 2 by welding. Further, the sleeve 35 has a piston support part 35a, a first butt part

35b, a first engaging part 35c, and a welded part on the turbine 11 side of the front cover 2.

The piston support part 35a supports the inner peripheral surface of the piston 25 so as to be movable in the axial direction on the outer peripheral surface. The first butt part 35b is formed in an annular shape on the outer peripheral surface of the piston support part 35a on the turbine 11 side. The first engaging part 35c is formed on the piston support part 35a side of the first butt part 35b adjacent to the first butt part 35b. The first engaging part 35c is annular and has a smaller diameter than the first butt part 35b. That is, a step is formed between the first butt part 35b and the first engaging part 35c. The welded part is laser welded.

—Oil Chamber Plate 36—

The oil chamber plate 36 has a disk shape. The oil chamber plate 36 is provided between the piston 25 and the turbine 11. The oil chamber plate 36 forms an oil chamber C, to which a hydraulic fluid is supplied, between itself and the piston 25. A seal member 38 is provided on the outer peripheral surface of the piston support part 35a, and the space between the piston support part 35a and the inner peripheral tubular part 25b of the piston 25 is sealed. Further, a sealing member 39 is provided on the outer peripheral surface of the oil chamber plate 36, and the space between the oil chamber plate 36 and the outer peripheral tubular part 25c of the piston 25 is sealed. With these configurations, the oil chamber C is sealed.

Here, the disk part 25a of the piston 25 is provided with a plurality of concave part 25d concaved on the front cover 2 side. Further, the oil chamber plate 36 is provided with a plurality of convex parts 36a that are inserted into and engaged with the concave part 25d of the piston 25. Therefore, the piston 25, the oil chamber plate 36, and the front cover 2 cannot rotate relative to each other, so they rotate integrally with each other.

The oil chamber plate 36 has a second butt part 36b and a second engaging part 36c on the inner peripheral surface. The second butt part 36b is in contact with the first butt part 35b of the sleeve 35 and is butt welded. The second engaging part 36c is annular and is formed on the oil chamber side of the second butt part 36b. The second engaging part 36c has a smaller diameter than the second butt part 36b.

In such a configuration, since the sleeve 35 and the oil chamber plate 36 are butt-welded, both members 35 and 36 can be connected with a lower amount of heat and also beads are reduced as compared with welding by other lap welding or the like.

Further, on the oil chamber side of each of the butt parts 35b and 36b, a first engaging part 35c and a second engaging part 36c having a diameter smaller than that of the butt parts 35b and 36b are provided, and these engaging parts 35c and 36c are engaged. Therefore, even if the oil pressure of the oil chamber C becomes high and the oil chamber plate 36 is pressed toward the turbine 11, the second engaging part 36c of the oil chamber plate 36 is supported by the first engaging part 35c of the sleeve 35, so the joint strength between the sleeve 35 and the oil chamber plate 36 can be maintained high.

—Oil Channel—

A first oil passage P1 and a second oil passage P2 are formed in the sleeve 35.

The first oil passage P1 connects the inner circumference of the sleeve 35 and the oil chamber C. The radial outer opening of the first oil passage P1 is formed between the outer peripheral surface of the piston support part 35a and the first butt part 35b in the axial direction. Here, an opening of the first oil passage P1 is provided between the piston support part 35a and the first butt part 35b in the axial direction. That is, the piston support part 35a, which requires high precision on the outer peripheral surface, and the first butt part 35b to be welded (that is, exposed to high heat) are axially separated from each other. Therefore, it is possible to prevent the outer peripheral surface (that is, the piston support surface) of the piston support part 35a from being affected by heat and the accuracy from being lowered.

The second oil passage P2 connects the inner circumference of the sleeve 35 and the space between the front cover 2 and the piston 25.

<Damper Part 28>

The Damper part 28 is provided on the outer peripheral side part of the lock-up device 4. The damper part 28 transmits torque from the clutch part 24 to the turbine 11, and absorbs and dampens torsional vibration.

As illustrated in FIGS. 1 to 4, the damper part 28 has a retaining plate 45 fixed to the connecting part 31a of the outer drum 31, a plurality of torsion springs 46, a driven plate 47, and a support plate 50.

—Retaining Plate 45 (Input Member)—

The retaining plate 45 is formed in a disk shape. The retaining plate 45 is provided between the front cover 2 and the driven plate 47 in the axial direction. The retaining plate 45 is connected to the clutch part 24. The retaining plate 45 supports a plurality of torsion springs 46 in the axial direction and the radial direction, and is engaged with the plurality of torsion springs 46 in the rotational direction.

The retaining plate 45 has an input side connecting part 451, an accommodating part 452, and a facing part 453.

The input side connecting part 451 is a part on the inner peripheral side of the retaining plate 45. The input side connecting part 451 is fixed to the connecting part 31a of the clutch part 24 by a rivet 19.

The plurality of accommodating parts 452 have a C-shaped cross section that bulges toward the front cover 2. The accommodating part 452 further extends from the outer peripheral side end of the input side connecting part 451 to the outer peripheral side. The plurality of accommodating parts 452 are provided side by side in the circumferential direction, and a torsion spring 46 is accommodated therein. In the present embodiment, the number of accommodating parts 452 is three.

The facing part 453 is formed so as to extend from the end part on the inner peripheral side of the input side connecting part 451 toward the turbine 11 side, and the tip thereof can come into contact with the driven plate 47.

—Driven Plate 47—

The driven plate 47 has a substantially disk shape and is rotatable relative to the retaining plate 45.

The driven plate 47 has a disk part 471, an output side support part 472, and a plurality of engaging parts 473.

The inner peripheral part of the disk part 471 is fixed to the outer peripheral part of the turbine shell 16 of the turbine 11 and the turbine hub 17 by the rivet 18.

The output side support part 472 is formed in a tubular shape having a predetermined width in the axial direction in the radial intermediate part of the disk part 471.

The plurality of engaging parts 473 are formed so as to extend outward in the radial direction from the outer peripheral end part of the disc part 471. The outer periphery of the engaging part 473 is bent toward the retaining plate 45. This bent part is engaged with the end face of the torsion spring 46.

—Torsion Spring 46—

The plurality of torsion springs 46 are accommodated in the accommodating part 452 of the retaining plate 45. In this embodiment, the number of torsion springs 46 is three.

The torsion spring 46 elastically connects the retaining plate 45 and the driven plate 47 in the rotational direction.

The circumferential end of the torsion spring 46 engages the outer peripheral part of the engaging part 473 of the driven plate 47.

—Support Plate 50—

The support plate 50 has a substantially disk shape, and has a plurality of connecting parts 51 (support parts), a regulating part 52 (annular part), and a plurality of stopper parts 53 (contact parts).

A plurality of connecting parts 51 are disposed between the retaining plate 45 and the driven plate 47 in the axial direction. Each connecting part 51 is connected to the retaining plate 45 by the rivet 19.

The regulating part 52 is formed in an annular shape and is provided between the driven plate 47 and the turbine 11. The regulating part 52 is provided to sandwich the driven plate 47 between it and a part of the retaining plate 45 in the axial direction. The regulating part 52 is axially faced to the facing part 453 of the retaining plate 45. Further, the inner peripheral end surface of the regulating part 52 is supported by the output side supporting part 472 of the driven plate 47. As a result, the support plate 50 is radially positioned by the driven plate 47.

The stopper part 53 is provided between the plurality of connecting parts 51 and the regulating part 52 so as to connect them. The circumferential length of the stopper part 53 is shorter than the circumferential length of the connecting part 51. More specifically, the stopper part 53 is formed so as to extend from the radially inner end part of the connecting part 51 toward the turbine 11 side in the axial direction. The regulating part 52 extends radially inward from the end part on the turbine 11 side in the axial direction of the stopper part 53. The stopper part 53 is a part where the support plate 50 and the driven plate 47 intersect in the axial direction.

The stopper part 53 can come into contact with the inner peripheral part (more specifically, the end face in the circumferential direction of the engaging part 473) of the engaging part 473 of the driven plate 47. The stopper part 53 prohibits the retaining plate 45 and the driven plate 47 from rotating relative to each other by a predetermined angle or more.

The support plate 50 further has a plurality of support parts 54. The support part 54 is provided on the outer peripheral part of the connecting part 51. The support part 54 is a part in which the outer peripheral part of the connecting part 51 is bent toward the turbine 11. The support part 54 supports the inner peripheral surface of the torsion spring 46. In the present embodiment, the number of support parts 54 is three.

The circumferential length of each of the plurality of support parts 54 is longer than the circumferential length of the stopper part 53, as described above. The circumferential length of each of the plurality of support parts 54 is 30% or more of the circumferential length of the elastic member.

[Actions]

First, the operation of the torque converter main body 3 will be described. When the front cover 2 and the impeller 10 are rotating, the hydraulic fluid flows from the impeller 10 to the turbine 11, and further flows to the impeller 10 via the stator 12. As a result, torque is transmitted from the impeller 10 to the turbine 11 via hydraulic fluid. The torque transmitted to the turbine 11 is transmitted to the input shaft of the transmission via the turbine hub 17.

When the speed ratio of the torque converter 1 increases and the input shaft reaches a determined rotation speed, the hydraulic fluid is supplied to the oil chamber C via the first oil passage P1. Also hydraulic fluid in the space between the front cover 2 and the piston 25 is discharged through the second oil passage P2. As a result, the piston 25 moves to the front cover 2 side. As a result, the pressing part of the piston 25 presses the first clutch plate 32 and the second clutch plate 33 against the side surface of the front cover 2 to enter a lock-up state (clutch-on state).

In the clutch-on state as described above, the torque is transmitted from the front cover 2 to the torque converter main body 3 via the Lock-up device 4. That is, the torque input to the front cover 2 is output to the turbine hub 17 via the clutch part 24 and the damper part 28. In this clutch-on state, the torque fluctuation is attenuated by damper part 28 of the lock-up device 4.

[Features]

When the lockup is turned off (clutch off state) from the lockup state, the oil chamber C is connected to the drain. As a result, the hydraulic fluid oil chamber C is discharged through the first oil passage P1. Then, the piston 25 moves to the turbine 11 side, and the pressure of the piston 25 on the first clutch plate 32 and the second clutch plate 33 is released. As a result, the clutch is off.

In the lock-up device 4, the sleeve 35 and the oil chamber plate 36 have butt parts 35b and 36b. That is, the oil chamber plate 36 is fixed to the sleeve 35 by butt welding. Therefore, the sleeve 35 and the oil chamber plate 36 can be welded with a lower amount of heat as compared with the case where they are fixed by lap welding, and the generation of welding beads can be suppressed.

In this lock-up device 4, a support plate 50 is provided separately from the member to which the torsion spring 46 is attached, and the support plate 50 supports the inner peripheral surface of the torsion spring 46. Therefore, in the retaining plate 45, it is not necessary to form a cut-up part or the like on the member to which the torsion spring 46 is attached, and the strength of the member to which the torsion spring 46 is attached does not decrease. Further, since the support plate 50 is a separate member, the circumferential length of the part supporting the torsion spring 46 can be increased. As a result, operation of the torsion spring 46 is stabilized.

In this lock-up device 4, the driven plate 47 is sandwiched between a pair of input side members (retaining plate 45 and support plate 50), so that they cannot move relative to each other in the axial direction. Further, in the lock-up device 4, the support plate 50 and the driven plate 47 are brought into contact with each other in the circumferential direction to form a stopper mechanism for regulating the twisting angle. That is, the stopper mechanism is composed of the support plate 50 and the driven plate 47, which cannot move relative to each other in the axial direction. Therefore, the problem in the conventional stopper mechanism, that is, the disengagement between the claw and the engagement hole (disengagement of the stopper mechanism) is eliminated.

Other Preferred Embodiments

The present invention is not limited to the above embodiments, and various modifications can be made without departing from the scope of the present invention.

(a) In the above embodiment, on the outer circumference of the sleeve 35, each butt portion 35b, 36b was disposed on the turbine 11 side and each engagement portion 35c, 36c was disposed on the front cover 2 side, but these can be reversed. In other words, each of the butt portions 35b, 36b can be placed on the front cover 2 side and each of the engagement portions 35c, 36c can be placed on the turbine 11 side.

(b) The first engaging part 35c and the second engaging part 36c need only contact each other in the axial direction on each side face, and the outer surface of the first engagement portion 35c and the inner surface of the second engagement portion 36c can be in contact with each other or can be separated from each other.

(c) In the above embodiment, the support plate 50 and the retaining plate 45 are made immovable relative to each other in the axial direction, and the stopper mechanism is formed by these plates, but the member on the input side is not limited to the support plate 50, and the member on the output side is not limited to the retaining plate 45. If the input side member and the output side member are made relatively immovable in the axial direction and the stopper mechanism is configured by them, the same operation and effect as those of the above-described embodiment can be obtained.

(d) The configuration of the stopper part 53 of the support plate 50 is not limited to the above embodiment. For example, the stopper part 53 can be formed by bending a part of the support plate 50 in the axial direction.

(e) The configuration of the clutch part 24 and the damper part 28 is not limited to the above embodiment. For example, the present invention can be applied in the same way to a single plate type clutch part 24. Further, the present invention can be similarly applied to the lock-up device 4 in which the damper part 28 is not provided.

REFERENCE SIGNS LIST

1 Torque converter
2 Front cover
4 Lock-up device
24 Clutch part
25 Piston
35 Sleeve
35a Piston support part
35b First butt part
35c First engaging part
36 Oil chamber plate
36b Second butt part
36c Second engaging part
C Oil chamber
P1 First oil passage

What is claimed is:

1. A lock-up device for a torque converter configured to transmit a torque from a front cover to a transmission-side member through a turbine, the lock-up device comprising:
   a clutch part disposed between the front cover and the turbine;
   a piston movably provided in an axial direction, the piston configured to bring the clutch part into a torque transmission state;
   a sleeve fixed to an inner peripheral part of the front cover, the sleeve having a piston support part, an annular first butt part, and an annular first engaging part, the piston support part configured to support an inner peripheral surface of the piston to be movable in the axial direction, the annular first butt part and the annular first engaging part formed on an outer peripheral surface of the sleeve, the annular first engaging part having a diameter smaller than that of the annular first butt part; and
   an annular oil chamber plate provided between the piston and the turbine, the annular oil chamber plate having an annular second butt part and a second engaging part on an inner peripheral surface of the oil chamber plate, the second engaging part having a diameter smaller than that of the second butt part, the second engaging part engaging with the first engaging part, the second butt part being butt-welded in contact with the first butt part, a contact surface between the first butt part and the second butt part extending in the axial direction,
   the annular oil chamber plate configured to form an oil chamber to which a hydraulic fluid is supplied between the oil chamber and the piston.

2. The lock-up device for a torque converter according to claim 1, wherein
   the annular first engaging part is disposed on a front cover side of the first butt part, and
   the second engaging part is disposed on an oil chamber side of the second butt part.

3. The lock-up device for a torque converter according to claim 1, wherein
   the front cover has a circular opening in a center, and
   the sleeve further has a welded part inserted into the circular opening of the front cover, the welded part being laser-welded.

4. The lock-up device for a torque converter according to claim 1, wherein the sleeve further has an oil passage to provide the hydraulic fluid to the oil chamber, and an opening of the oil passage is formed between the piston support part and the first butt part in the axial direction.

* * * * *